United States Patent [19]
Melton

[11] 4,062,496
[45] Dec. 13, 1977

[54] SPREADER FOR PARTICULATE MATERIAL

[76] Inventor: Conrad Melton, 201 Sloan Drive, Waynesville, N.C. 28786

[21] Appl. No.: 734,657

[22] Filed: Oct. 21, 1976

[51] Int. Cl.² .............................................. A01C 17/00
[52] U.S. Cl. ..................... 239/683; 239/687; 222/228; 222/231
[58] Field of Search ............... 222/196, 564, 410, 201, 222/231, 228; 239/681, 683, 684, 685, 687, 223, 224, 661, 659

[56] References Cited

U.S. PATENT DOCUMENTS

| | | | |
|---|---|---|---|
| 2,220,275 | 11/1940 | Preston | 239/223 |
| 2,980,009 | 4/1961 | Donelson, Jr. | 239/683 X |
| 3,045,840 | 7/1962 | Donelson, Jr. | 239/683 X |
| 3,155,542 | 11/1964 | Cordell et al. | 239/224 X |
| 3,288,052 | 11/1966 | Hough | 239/223 X |
| 3,374,956 | 3/1968 | Bazilli et al. | 239/683 |

FOREIGN PATENT DOCUMENTS 43,369 11/1930 Denmark ............................ 239/684

Primary Examiner—John J. Love
Attorney, Agent, or Firm—Reuben Wolk

[57] ABSTRACT

A spreader for particulate material, particularly for wet lime. The mechanism compresses a cover which is placed on the vertical shaft of a conventional spin spreader. The particulate material is placed on the cover and is vibrated into a hopper, then dispersed within the hopper and spread by blades mounted on the shaft.

16 Claims, 3 Drawing Figures

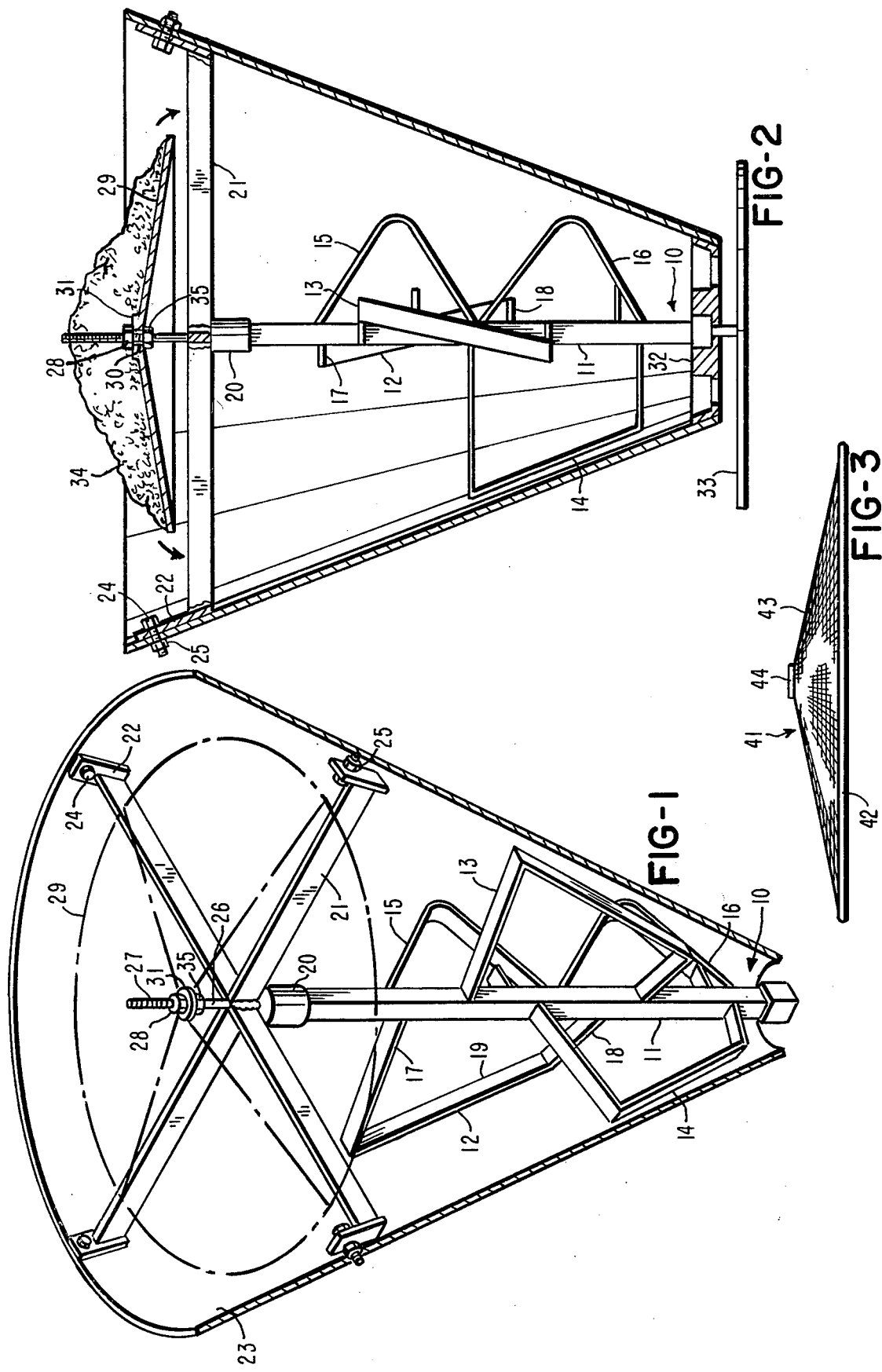

SPREADER FOR PARTICULATE MATERIAL

BACKGROUND OF THE INVENTION

No facet of farming is more important to the success of the operation than fertilizing the ground. From the days of hand distribution of fertilizers to the present time, there have been many devices for improvement of spreading techniques, and now there are many machines on the market for this purpose. One early example of a spreader is shown in U.S. Pat. No. 2,243,996, in which a fan is mounted in a hopper to distribute dry material. Another device, shown in U.S. Pat. No. 3,193,297, utilizes curved blades which receive a powdery material and fling it away from the device. Similar mechanisms are shown in U.S. Pat. No. 3,523,648, in conjunction with a garden tractor, and U.S. Pat. No. 3,615,055.

In all the above devices, the particulate material being dispensed is powdered. While powdered lime is the most popular type, conditions often exist where such lime is scattered by the winds. It is frequently desirable to use wet lime because it clings to the soil and is not blown away, and is capable of gradually releasing its nutrients into the soil. From an economic sense wet lime is highly desirable, because it can be produced as a by-product of other processes for less than one-tenth the cost of producing dry lime. It is therefore highly important to develop a mechanism capable of spreading wet lime, and the prior art devices are totally useless for such materials, because they would tend to clog almost at once. Merely placing such material within the hopper, as would be done with dry materials, is unsatisfactory because the material would cake immediately.

SUMMARY OF THE INVENTION

My novel device provides for the first time a means for spreading other than dry particulate materials, such as wet lime. Not only can I accomplish this in a simple and effective manner, but I can do so by mounting my device on existing equipment such as tractors, commercial spreaders, or bulldozers, or any other machinery having a power take-off. It is, of course, possible to utilize my device in a simple hand-operated mechanism as well.

My invention consists primarily of a cover which is placed over the vertical shaft of a conventional spreading mechanism. Upon this cover is placed the wet lime of other material to be spread, and is surrounded by a hopper. Motion of the mechanism causes the material to fall between the edges of the cover and the wall of the hopper in a gradual manner, this occurring to a natural vibratory motion of the cover. The material is dropped on the dispensing blades and then dispersed in a normal manner.

The cover is preferably tapered outwardly in a downward direction so that the center of the cover is the high point. This provides a crowned shape which supports the material but allows it to drift down the sides and gradually drop into the hopper in a controlled manner. Other shapes of the cover are optional, as will be described below.

Further details of my novel mechanism and method of distributing particulate material are described in the following description and the exemplary drawings.

BRIEF DESCRIPTION OF THE DRAWINGS

FIG. 1 is a perspective view of my novel mechanism, with parts broken away for clarity.

FIG. 2 is a side view of the mechanism of FIG. 1, with parts broken away to illustrate operation of the mechanism with particulate material.

FIG. 3 is a perspective view illustrating a modified form of cover which is foraminous instead of solid.

DESCRIPTION OF THE PREFERRED EMBODIMENT

Referring now to FIG. 1, the novel mechanism consists of a rotating member designated generally by reference numeral 10, and comprised of a central shaft 11 which is shown as having a square cross-section, but which may be of round or other cross-section. Welded or otherwise affixed to the sides of the shaft are a plurality of agitators designated by reference numerals 12, 13, 14, 15, and 16. Although three of these agitators are shown, it is understood that this number is not critical, but two or more may be utilized. Some of the agitators are formed of horizontally extending flat bars interconnected by angled flat bars, such as bars 17, 18, and 19 which comprise agitator 12, or the similar construction of agitators 13 and 14. On the other hand some of the agitators are formed of curved flat bars, such as 15 and 16. The exact configuration and construction of the agitators is not critical, since their function is to help distribute the material to be spread. The primary consideration of this construction is to space the agitators to assist in distribution by breaking up the mass of material and permitting it to be more evenly spread.

A bearing 20 is located at the upper end of the shaft 11, permitting the shaft to rotate within the bearing. Secured to the bearing, such as by welding or similar means, are a plurality of outwardly extending support struts 21; four of these struts are illustrated but it should be understood that this number is not critical and that three, five, or even more may be utilized. At the outer end of each strut is mounted a flat plate 22 which is generally vertical but angled to a slight degree. This angle conforms to the taper of the hopper 23, the plates being in contact with the inner wall of the hopper and secured thereto by means of bolts 24 and nuts 25. The struts therefore maintain the bearing 20 stationary so that the shaft 11 is free to rotate within the hopper.

Extending upwardly from the struts 21 is a smaller shaft 26 which is threaded at its uppermost end 27. An adjusting nut 28 is threaded on this end 27. The cover 29 is mounted on the shaft 26, being supported by a lower nut 35, which may be rotated up or down to provide a desired spacing with respect to the hopper wall. The cover has a central aperture 30 through which the shaft 26 is inserted, the aperture being reinforced by a boss 31. The upper nut 28 is loosely mounted on the shaft.

The cover 29 is preferably formed of approximately one-eighth thick sheet steel and generally circular in shape but is tapered outwardly from its center to the edges in a downward direction. It is thus crowned with the high point in the center. It is also possible to make the cover flat, but with somewhat diminished efficiency. As a further variation, the cover may be foraminous, as shown in FIG. 3, in which the modified cover 41 is formed with a screen 43 and reinforced at its edges with a stiffener 42 and at its center with a boss 44. Other variations are also contemplated.

The basic inventive concept is expressed above, but in order to place the invention in context, it is understood that the mechanism described should be used with conventional spreading mechanisms such as described in the patents listed above. As shown in FIG. 2, the shaft 11 may have a lower end which is engaged by a power drive member 32 that rotates the entire shaft. The lower end of the hopper fits within a spreading mechanism 33 which is only schematically illustrated in FIG. 2, but which may be similar to any of those in the patents listed above.

When it is desired to spread the particulate material 34, it is piled on the cover 29 and the entire spreading mechanism is moved. The cover is supported loosely on lower nut 35, while upper nut 28, above the cover, is loose upon the shaft. Thus, the cover floats freely on the shaft 26, and vibrates so that the material sifts over the edges of the cover and falls into the hopper. It has been found that with wet lime a clearance of about 6 inches between the edge of the cover and the nearest inner surface of the hopper is desirable, although the exact distance is varied according to the material used and the density of distribution desired. The agitators rotate with the shaft and disperse the material, dropping it upon the spreader 33 which strews it to the ground. The density of the material being spread may be controlled by speed of moving the entire spreading mechanism. Instead of the cover 29 floating freely upon the shaft 26, it may be locked on the shaft by tightening the upper nut 28 so that the cover is clamped against the lower nut 35. The cover thus rotates with the shaft, but still distributes the particulate material by the combination of rotation and vibration.

The embodiments illustrated are merely exemplary and other variations within the scope of the invention are contemplated.

I claim:

1. A spreader for particulate material comprising a vertical rotatable shaft, a device mounted on said shaft for supporting said material, and a hopper surrounding said shaft and said material supporting device, said device being free floating on said shaft and dispensing quantities of said material into said hopper and including means for dispensing said material at a controlled rate.

2. The spreader of claim 1 in which said device is a generally circular flat plate.

3. The spreader of claim 1 in which said device has a hollow conical surface with an apex mounted on said shaft and a circular outer edge lower than the apex, said material supported on the outer surface of said device and being dispensed over said outer edge.

4. The spreader of claim 3 in which said hollow conical surface is foraminous.

5. The spreader of claim 1 in which said shaft and said material supporting device are rotatable.

6. The spreader of claim 1 in which said shaft is rotatable and said material supporting device is supported by but not rotatable with said shaft, said means capable of independent motion when said shaft is rotated.

7. The spreader of claim 6 in which said independent motion is vibratory.

8. The spreader of claim 1 in which said shaft includes agitator means to disperse said material within said hopper.

9. The spreader of claim 1 including adjustable means on said shaft adjacent said material supporting device, said means regulating the relationship between said device and said hopper.

10. The spreader of claim 1 in which said shaft includes agitator means to disperse said material within said hopper, said shaft further supported by a plurality of members secured to said hopper; said material supporting device having a hollow conical surface with an apex mounted on said shaft and a circular outer edge lower than the apex, said device adjustably supported on said shaft to permit regulation of the relationship between said device and said hopper, said device having a vibratory motion independent of the rotation of said shaft to provide said dispensing of material.

11. In an apparatus for spreading particulate material including a hopper, a distributing mechanism below said hopper, a vertical shaft within said hopper, and means for rotating said shaft; the improvement comprising a device mounted and free floating on said shaft and also within said hopper for supporting said material, said device including means for permitting quantities of said material to be dispersed therefrom into said hopper at a controlled rate.

12. The apparatus of claim 11 in which said device consists of a hollow conical plate having an apex mounted on said shaft and a circular outer edge lower than said apex, said material supported on the outer surface of said device and being dispensed over said outer edge.

13. The apparatus of claim 12 in which said shaft has adjustable means for supporting said plate, said means capable of regulating the space between the edge of said plate and said hopper.

14. The apparatus of claim 12 in which said plate is rotatable with said shaft.

15. The apparatus of claim 12 in which said plate is loosely supported on said shaft and does not rotate therewith, said device capable of vibratory motion independent of the rotating motion of said shaft.

16. The apparatus of claim 12 in which the outer edge of said plate is spaced approximately 6 inches inward of the nearest portion of said hopper.

* * * * *